United States Patent Office 3,278,447
Patented Oct. 11, 1966

3,278,447
PROCESS FOR STABILIZING CHLORINE
DIOXIDE SOLUTION
Thomas P. McNicholas, Greenville, R.I., assignor to
Cloro-Bac Products, Inc., Esmond, R.I., a corporation
of Delaware
No Drawing. Filed Dec. 2, 1963, Ser. No. 327,500
6 Claims. (Cl. 252—187)

The present invention relates to compositions containing chlorine dioxide, useful as disinfecting, cleaning and bleaching agents, etc. and to methods for making the same; more particularly it relates to novel stabilized solutions of chlorine dioxide and methods for making the same.

Chlorine dioxide, which is normally a gas, is a well known germicide, as well as a disinfecting, cleaning and bleaching agent.

For most applications, it is not practical to use the gaseous chlorine dioxide as such for a number of reasons. Therefore, it is available and used in aqueous solution. One method of making such solution is to bubble the gaseous chlorine dioxide through water to produce a saturated chlorine dioxide solution. A serious problem with such solutions is that only a relatively small amount of the chlorine dioxide gas remains in solution after preparation thereof, such amount being too small for practical purposes except for water purification. The reasons for this are (1) the amount of chlorine dioxide capable of being dissolved is small and (2) upon standing the chlorine dioxide, except for small amounts, is given off. Put in another way, chlorine dioxide solutions per se which are sufficiently concentrated for most purposes are too unstable. Sodium perborate has been used to increase the concentration of chlorine dioxide which can be placed in stable solution, the chlorine dioxide being bubbled into water containing sodium perborate.

However, there has been a need to further increase the stable chlorine dioxide concentration, one reason being reduction of shipping costs and another being the desirability of providing stronger solutions for certain purposes.

It is an object of the present invention to fill this need, i.e. to increase the stable chlorine dioxide concentration in aqueous solutions thereof.

It has been discovered that the use of alkali metal (sodium) percarbonate instead of sodium perborate increases the amount of chlorine dioxide which can be held in stable solution as much as three hundred percent. It is believed that the sodium percarbonate becomes chemically bonded in some way through the peroxy radical to the chlorine dioxide to thereby hold the chlorine dioxide in solution until it comes into contact with a media which changes the pH factor during use upon which the chlorine dioxide is released. In any event, tests have proved that the chlorine dioxide is not present in the form of a chlorite or chlorous acid. Preferably, an amount of sodium percarbonate is used which will produce a saturated solution thereof in the final product. In practice, about two parts by weight of percarbonate for each part of chlorine dioxide has been found to provide optimum stable $ClO_2$ concentrations. If lesser amounts are used, stability of the same chlorine dioxide concentration is decreased. However, such lesser amounts provide stable solutions of lesser $ClO_2$ concentrations.

*Example 1*

17 lbs. of chlorine dioxide were bubbled into 90 gallons of water at room temperature while adding 100 lbs. of sodium perborate. The chlorine dioxide concentration was 2% based on total weight of the resulting mix. The $ClO_2$ concentration did not decreases upon standing for a period of five months. Increasing the amount of chlorine dioxide did not result in any increase in solution concentration. Instead, the excess chlorine dioxide escaped from the solution. Adjustment of the amount of perborate did not increase the maximum $ClO_2$ concentration.

*Example 2*

50 lbs. of chlorine dioxide were bubbled into 90 gallons of water at room temperature over a period of twenty four hours while adding 100 lbs. of sodium percarbonate containing 70% by weight carbonate and 30% hydrogen peroxide. The chlorine dioxide concentration was 6% by weight of the resulting mix and did not decrease upon standing for a period of five months. Increasing the amount of chlorine dioxide did not result in any increase in solution concentration. Instead the excess chlorine dioxide escaped from the solution. Adjustment of the amount of percarbonate did not appreciably increase the maximum chlorine dioxide concentration.

Although the use of percarbonate substantially increases the maximum stable chlorine dioxide concentration, the cost of the product, even though less than with the use of perborate because of increased $ClO_2$ concentration, is still relatively high because of the high cost of percarbonate. It is an object of the present invention to produce stable chlorine dioxide solutions of concentrations at least as high as those achieved with percarbonate at only a fraction, as little as about ¼ of the cost and to produce such solutions with other materials.

This is achieved by virtue of the discovery that it is the active oxygen of the hydrogen peroxide of the percarbonate in combination with the carbonate thereof which increases the stable $ClO_2$ concentration and that substantially less (50% less) active oxygen is required to do this than is present in the percarbonate containing the necessary amount of carbonate. Thus, with percarbonate, of necessity, twice as much hydrogen peroxide is being used than is necessary to stabilize the chlorine dioxide. Therefore, by using an alkali metal (sodium) carbonate or bicarbonate (both are inexpensive) and a metered quantity of hydrogen peroxide, or some other source of active oxygen such as ozone, substantially less than the quantity present in percarbonate containing the same amount of carbonate, the same stable concentration of chlorine dioxide can be achieved at only a fraction (about 1¼) of the cost using the relatively expensive percarbonate.

The present invention also contemplates using the excess peroxide or active oxygen in the percarbonate by addition of sodium carbonate or bicarbonate to the percarbonate in sufficient amount to utilize all the available active oxygen.

Although it is believed that the active oxygen of the hydrogen peroxide, added as such or present in the percarbonate, causes the chlorine dioxide to become bound in some way to carbonate or bicarbonate to thereby hold it in solution, the resulting composition does not contain any hydrogen peroxide or active oxygen.

Commercially available sodium percarbonate, e.g. that sold by Food Machinery Company, contains seventy percent by weight sodium carbonate and 30% hydrogen peroxide. Of the 30% hydrogen peroxide about 47% by weight is active oxygen so that the percarbonate contains about 14% of active oxygen and 70% carbonate. However, only about half of this amount of active oxygen is required for the amount of sodium carbonate present in the percarbonate for optimum stable $ClO_2$ concentrations so that about 7% active oxygen or 15% hydrogen peroxide, is being wasted. Not only does this result in a waste of the hydrogen peroxide but the cost of combining such unused hydrogen peroxide with the carbonate is also wasted. Put in another way, the ratio of hydrogen peroxide to sodium carbonate in the percarbonate is higher than that required to achieve equally as good results. The present invention, by supplying the active oxygen separately from the carbonate permits the proper amount of active oxygen to be added with substantial savings.

The active oxygen can be supplied as ozone, hydrogen peroxide or any other peroxy compound such as calcium, magnesium, sodium or urea peroxide, alkali metal, perborate, persulphate or perphosphate and other peroxides and peracid salts.

A preferred ratio by weight of carbonate or bicarbonate to chlorine dioxide is between about 1.5 to 1 and 1.2 to 1 but this may vary considerably with good results. If the ratio is decreased much less than 1.2 to 1 the maximum concentration of chlorine dioxide which can be held in stable solution is decreased but so long as there is some carbonate or bicarbonate together with active oxygen, an increased stable concentration is achieved compared to the use of no carbonate. Saturated carbonate or bicarbonate solutions are preferred. The ratio of carbonate or bicarbonate to chlorine dioxide can be greater than 1.5 to 1.0 but little improvement results so that the increased expense is not warranted.

For optimum results, the amount of hydrogen peroxide should not be much less than 14 or 15% by weight, based on carbonate and/or bicarbonate and hydrogen peroxide, or about 0.20 part by weight per part of carbonate and/or bicarbonate. In terms of active oxygen (about 47% of hydrogen peroxide is active oxygen) this is about 0.1 part active oxygen per part of carbonate and/or bicarbonate. Thus, where active oxygen is used as such, e.g. ozone, optimum results are achieved with 0.1 part active oxygen per part of carbonate and/or bicarbonate. No noticeable improvement results by increasing the hydrogen peroxide or active oxygen beyond this amount so that the increase in cost in doing so is not warranted and the main advantage of cost saving is not achived. As aforesaid, with the percarbonate, the amount of active oxygen comprises 0.2 part per part carbonate so that if, in the present invention, it is much more than 0.15 part per part carbonate, although there is a cost savings of 25%, it is not nearly as marked. If the amount of hydrogen peroxide or active oxygen is decreased much below this amount, i.e. 0.1 part per part carbonate and/or bicarbonate, the maximum stable $ClO_2$ concentration achievable is decreased but so long as there is some active oxygen in the presence of the carbonate and/or bicarbonate improved results are achieved.

Where active oxygen is supplied in the form of ozone or liquid hydrogen peroxide, other basic alkali metal salts of inorganic acids containing oxygen but no chlorine in the acid radical can be used, as for example, sodium or potassium borate, sulphate, phosphate, etc. However, alkali metal carbonate and/or bicarbonate are preferred.

In preparing the chlorine dioxide solutions of the present invention, the carbonate, bicarbonate or other basic salt and the hydrogen peroxide or active oxygen are continuously fed into the water at uniform metered rates dependent on the rate of addition of chloride dioxide, which is also added at a uniform rate. In this way, the pH of the solution remains about the same over the entire period of compounding. The rate of chlorine dioxide addition depends upon the output of the $ClO_2$ generator since a preferred form of the invention contemplates adding the $ClO_2$ to the water as it is generated, e.g. from chlorate and acid.

In compounding the solutions of the present invention, they are maintained at a neutral or basic pH.

*Example 3*

Seventy pounds of sodium carbonate and fifteen pounds of liquid hydrogen peroxide in the form of a 35% aqueous solution (forty five lbs. solution) were continuously added at metered rates to 90 gals. of water at room temperature over a period of 24 hours. At the same time, chlorine dioxide gas generated from sodium chlorate and sulfuric acid was bubbled continuously up into the water over the same period of twenty-four hours, after which time fifty-two pounds had been added to provide a stable chlorine dioxide concentration of 6% by weight of the total mix, which did not decrease upon standing for a period of five months.

*Example 4*

Example 3 was repeated except that sodium bicarbonate was used instead of sodium carbonate with equally good results.

Where percarbonate (70% carbonate and 30% hydrogen peroxide) is used, 100 lbs. is necessary to provide the same 70 lbs. of carbonate, which requires 30 lbs. of hydrogen peroxide, whereas in Examples 3 and 4 only 15 lbs. of hydrogen peroxide were used with equally good results. The 100 lbs. of percarbonate costs forty cents per lbs. (market price) or $40.00 whereas 70 lbs. of sodium carbonate at $0.04 per lb. (market price) costs $2.80 and fifteen lbs. of liquid hydrogen peroxide at about $0.60 per lb. (actually such peroxide is bought in the form of a 35% solution at a market price of $0.20 per pound) costs $9.00, the carbonate and hydrogen peroxide together costing $11.80 compared to a cost of $40.00 using percarbonate, almost four times more. This is indeed quite remarkable.

*Example 5*

100 lbs. of sodium percarbonate, containing 70% by weight of carbonate and 30% by weight of hydrogen peroxide, and 70 lbs. of sodium carbonate (a total of 140 lbs. of carbonate to 30 lbs. of hydrogen peroxide) were added at uniform metered rates to 180 gals. of water at room temperature over a 48 hour period while at the same time bubbling 104 lbs. of $ClO_2$ into the water to provide a stable 6% $ClO_2$ solution which did not decrease in concentration after standing for five months.

*Examples 6 and 7*

These examples were the same as Examples 3 and 4, except that instead of hydrogen peroxide, 7 lbs. of ozone generated between a pair of electrode plates was used with good results.

*Example 8*

Same as Example 3 except twenty lbs. of sodium peroxide was used instead of the hydrogen peroxide. The results were as good as Example 3 except that the end product contained additional sodium which is not preferred.

*Example 9*

Same as Example 3 except seventy lbs. of sodium pyrophosphate was used instead of the carbonate with good results.

*Example 10*

Same as Example 3 except seventy lbs. of sodium borate was used instead of the carbonate with good results. However, borate is not preferred where the product is to be used with food or food handling equipment because it is more toxic than carbonate.

In all the above examples, the resulting solution contained no hydrogen peroxide or active oxygen as such. Evidently, in whatever way the peroxy or active oxygen causes the $ClO_2$ to bond to the basic salt, it disappears in the process. The $ClO_2$ exists as such in the solution because it can be removed from the solution as $ClO_2$ and and not $Cl_2$ and oxygen.

Also, in all the examples, the solution was neutral or basic during and after compounding.

It is known to use percarbonate, hydrogen peroxide and perborate in chlorite solutions to suppress the formation of chlorine dioxide. However, the present composition is not a chlorite but rather a complex of the carbonate or bicarbonate and the chlorine dioxide and is free from chlorine. Whereas, the object of using these peroxy compounds in chlorite solutions is to insure against the presence of $ClO_2$ in the solution, the solution of the present invention contains $ClO_2$ as its active ingredient and does not contain chlorite. Thus, when the solution of Example 3 is dried only a sodium carbonate residue is left, the gaseous $ClO_2$ and water being driven off. No sodium chlorite is in the residue. On the other hand, when a sodium chlorite solution containing hydrogen peroxide is dried, the residue is sodium chlorite. With a sodium chlorite solution containing hydrogen peroxide and sodium carbonate or sodium percarbonate, the residue resulting from drying also contains sodium chlorite. Also, oxalic acid which changes color when brought into contact with chlorine or chlorite but not chlorine dioxide does not change color when added to the composition of the present invention.

It is pointed out that the use of hydrogen peroxide or active oxygen alone does not increase the maximum stable concentration of chlorine dioxide in solution but that the carbonate or bicarbonate or some other basic alkali metal salt of an inorganic acid containing oxygen but not chlorine must also be present.

It is also pointed out that if there is any chlorine (which is present in the reaction mix generated by reacting chlorate and acid to form chlorine dioxide and which is always present in commercial chlorite solutions) in the $ClO_2$ solutions of the present invention they cannot be stabilized. Evidently, under such conditions, the active oxygen does not tie the chlorine dioxide to the basic salt. In the present case, a pure $ClO_2$ is stripped from the generated reaction mixture and is added to water together with the carbonate and hydrogen peroxide so that there is no chlorine or chlorite present.

It is known to add hydrogen peroxide and other peroxy compounds such as percarbonates to the chlorate-acid reactors in generating $ClO_2$ or to the reaction mix to suppress the rate of evolution of the chlorine dioxide but this does not give the advantages of the present invention because of the presence of reaction products other than chlorine dioxide, e.g. chlorine, chloric and chlorous acids and chlorate, any or all of which prevent stabilization by the percarbonate. The chlorine dioxide gas is usually stripped from such reaction mix and added to water in which case the percarbonate is left behind or the chlorine dioxide is generated at the place where it is to be used and the generated reaction mix used immediately, as such, e.g. a bleach bath, so that stabilization is not a problem.

Although certain theories and examples have been set forth above, the invention is not limited thereto or thereby but only to the compositions and methods recited in the following claims and their equivalents.

I claim:

1. A method of making a stable chlorine dioxide solution comprising adding separately to water (1) a source of active oxygen selected from the group consisting of ozone, hydrogen peroxide, calcium, magnesium, sodium and urea peroxide and alkali metal perborate, persulfate and perphosphate and (2) a salt of the group consisting of alkali metal carbonate and bicarbonate and alkali metal borate, sulfate and phosphate, and (3) chlorine dioxide gas substantially free from chlorine, said chlorine dioxide gas being added by bubbling it through said solution, the amount of active oxygen in said source being substantially less than 0.2 part by weight per part of said salt.

2. A method according to claim 1, said salt being selected from the group consisting of sodium carbonate and bicarbonate.

3. A method according to claim 2, the source of said active oxygen comprising hydrogen peroxide.

4. A method according to claim 2, the source of said active oxygen comprising ozone.

5. A method according to claim 1, said salt compound, said source of free oxygen and said chlorine dioxide being separately added to said water simultaneously and gradually over an extended period at substantially uniform rates.

6. A method according to claim 1, the amount of active oxygen in said source being not substantially less than 0.1 part by weight per part of said salt.

References Cited by the Examiner
UNITED STATES PATENTS

| | | | |
|---|---|---|---|
| 2,150,926 | 3/1939 | Krauffman et al. | 8—111.5 |
| 3,082,146 | 3/1963 | Wentworth et al. | 167—17 |
| 3,084,995 | 4/1963 | Grubitsch | 252—187 XR |
| 3,123,521 | 3/1964 | Wentworth et al. | 252—187 XR |

LEON D. ROSDOL, *Primary Examiner.*

JULIUS GREENWALD, ALBERT T. MEYERS,
*Examiners.*

M. WEINBLATT, *Assistant Examiner.*